US012694599B2

(12) United States Patent (10) Patent No.: US 12,694,599 B2
Ujitoko et al. (45) Date of Patent: Jul. 28, 2026

(54) APPARENT FORCE CONTROL DEVICE, APPARENT FORCE PRESENTATION SYSTEM, APPARENT FORCE CONTROL METHOD, AND PROGRAM

(71) Applicant: NTT, Inc., Tokyo (JP)

(72) Inventors: Yusuke Ujitoko, Tokyo (JP); Takahiro Kawabe, Tokyo (JP)

(73) Assignee: NTT, Inc., Tokyo (JP)

( * ) Notice: Subject to any disclaimer, the term of this patent is extended or adjusted under 35 U.S.C. 154(b) by 116 days.

(21) Appl. No.: 18/719,923

(22) PCT Filed: Dec. 23, 2021

(86) PCT No.: PCT/JP2021/047988
§ 371 (c)(1),
(2) Date: Jun. 14, 2024

(87) PCT Pub. No.: WO2023/119582
PCT Pub. Date: Jun. 29, 2023

(65) Prior Publication Data
US 2025/0157121 A1 May 15, 2025

(51) Int. Cl.
*G06T 13/80* (2011.01)
*G06T 13/20* (2011.01)
(52) U.S. Cl.
CPC .............. *G06T 13/80* (2013.01); *G06T 13/20* (2013.01)
(58) Field of Classification Search
CPC ................................ G06T 13/20; G06F 3/016
See application file for complete search history.

(56) References Cited

U.S. PATENT DOCUMENTS

| | | | | |
|---|---|---|---|---|
| 10,852,827 B1 * | 12/2020 | Bochereau | ............... | G08B 6/00 |
| 11,199,903 B1 * | 12/2021 | Jung | ........................ | G06F 3/011 |
| 11,416,065 B1 * | 8/2022 | Chan | ........................ | G06F 3/011 |
| 2007/0072601 A1 * | 3/2007 | Kim | .................. | H04M 1/72475 |
| | | | | 455/423 |
| 2018/0349690 A1 * | 12/2018 | Rhee | .................... | H04N 13/239 |
| 2019/0064927 A1 * | 2/2019 | Tachi | ....................... | G06F 3/016 |
| 2023/0244313 A1 * | 8/2023 | Ishikawa | ................. | A63F 13/28 |
| | | | | 345/156 |
| 2023/0341936 A1 * | 10/2023 | Inoue | .................... | G06F 3/0325 |
| 2025/0157121 A1 * | 5/2025 | Ujitoko | .................. | H04N 5/262 |

FOREIGN PATENT DOCUMENTS

| | | |
|---|---|---|
| WO | 2008/111245 A1 | 9/2008 |
| WO | 2017/175867 A1 | 10/2017 |

OTHER PUBLICATIONS

Fakhoury et al. (2015) "The effect of indentation force and displacement on visual perception of compliance", 2015 IEEE World Haptics Conference (WHC), 2015, pp. 88-93, doi: 10.1109/WHC.2015.7177696 [online] Accessed on Dec. 10, 2021, website: https://ieeexplore.ieee.org/document/7177696.

* cited by examiner

*Primary Examiner* — Ryan M Gray

(57) ABSTRACT

The present invention includes vibrating a second presentation visual object with respect to a first presentation visual object so as to include a vibration component of a specific control frequency, the second presentation visual object being in contact with or in proximity to the first presentation visual object, and making an apparent force appear to be applied from the second presentation visual object to the first presentation visual object.

14 Claims, 10 Drawing Sheets

| VIBRATION INDEX:<br>FREQUENCY COMPONENT<br>OF 4-7 HZ   [log(pixel^2)] | APPARENT FORCE<br>INDEX: MAGNITUDE OF<br>APPARENT FORCE |
|---|---|
| 0 | 40 |
| 4 | 50 |
| 8 | 60 |
| 12 | 70 |
| ... | ... |

APPARENT FORCE CONTROL DEVICE, APPARENT FORCE PRESENTATION SYSTEM, APPARENT FORCE CONTROL METHOD, AND PROGRAM

CROSS-REFERENCE TO RELATED APPLICATIONS

This application is a U.S. 371 Application of International Patent Application No. PCT/JP2021/047988, filed on 23 Dec. 2021, the disclosure of which is hereby incorporated herein by reference in its entirety.

TECHNICAL FIELD

The present invention relates to a technique for controlling magnitude of an apparent force perceived by a human.

BACKGROUND ART

When the same magnitude of force is applied to objects of various softness, the objects deform with different deformation amounts. A human can easily recognize a difference in softness of an object only by observing this state with a video. That is, the difference in the deformation amount of the object in the video contributes to a difference in a softness feeling of the object (see, for example, Non Patent Literature 1).

CITATION LIST

Non Patent Literature

Non Patent Literature 1: E. Fakhoury, P. R. Culmer and B. Henson, "The effect of indentation force and displacement on visual perception of compliance", 2015 IEEE World Haptics Conference (WHC), 2015, pp. 88-93, doi: 10.1109/WHC.2015.7177696, [Searched on Dec. 10, 2021], the Internet <https://ieeexplore.ieee.org/document/7177696>

SUMMARY OF INVENTION

Technical Problem

Based on this fact, when the deformation amount of the object in the video is increased in image processing, the object in the video can be felt softer than the original object.

However, existing methods cannot present an apparent force (hereinafter "apparent force") that appears to be applied to some visual object (hereinafter "presentation visual object"), such as an object.

The present invention has been made in view of such a point, and an object of the present invention is to present an apparent force that appears to be applied to a presentation visual object.

Solution to Problem

The present invention includes vibrating a second presentation visual object with respect to a first presentation visual object so as to include a vibration component of a specific control frequency, the second presentation visual object being in contact with or in proximity to the first presentation visual object, and making an apparent force appear to be applied from the second presentation visual object to the first presentation visual object.

Advantageous Effects of Invention

As a result, it is possible to make an apparent force be applied from the second presentation visual object to the first presentation visual object.

DESCRIPTION OF EMBODIMENTS

Hereinafter, embodiments of the present invention will be described.

Principles

First, principles will be described.

The inventor of the present invention has found a natural law (physiological law) that it is possible to make an apparent force appear to be applied from a second presentation visual object to a first presentation visual object (it is possible to make a force magnitude feeling perceivable) by vibrating the second presentation visual object with respect to the first presentation visual object so as to include a vibration component of a specific control frequency, the second presentation visual object being in contact with or in proximity to the first presentation visual object. Further, the inventor has also found a natural law that it is possible to control the magnitude of the apparent force (force magnitude feeling) by controlling the magnitude of the vibration component of the control frequency included in such vibration. First, experimental results showing these natural laws will be exemplified.

Experiment

Figure 3A:
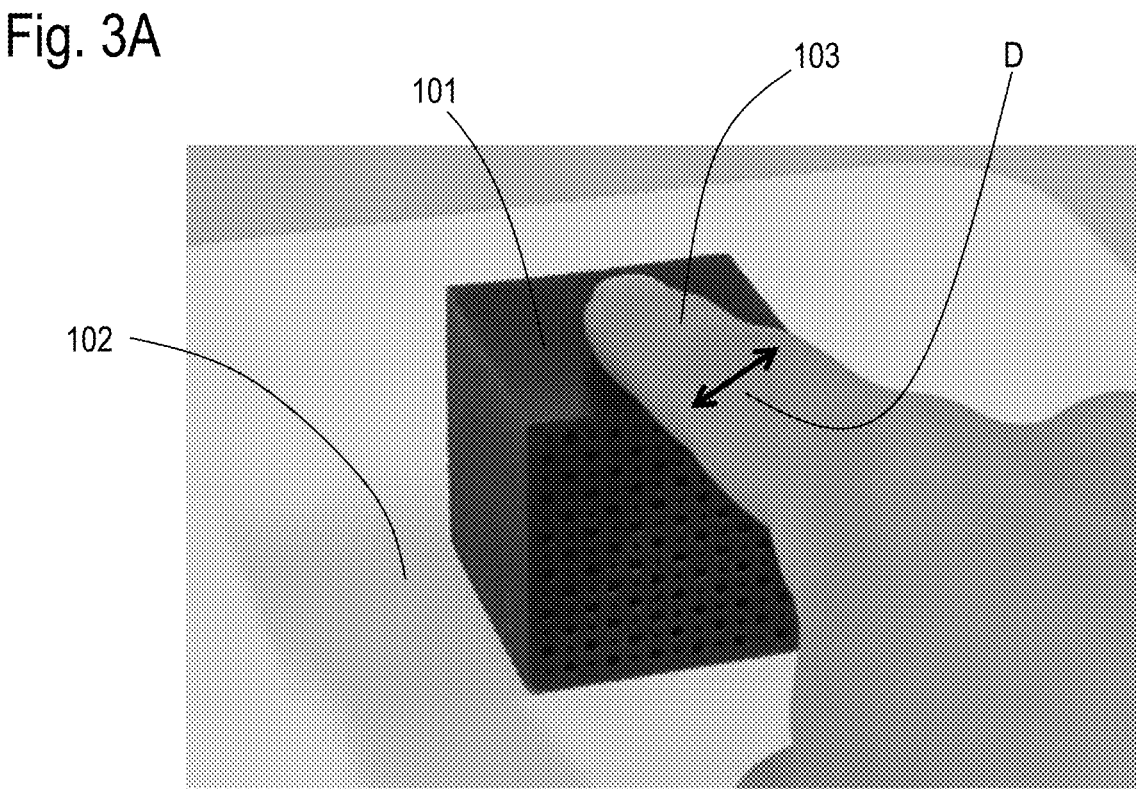
FIGS. 3A and 3B are diagrams for describing experimental content.
Figure 3B:
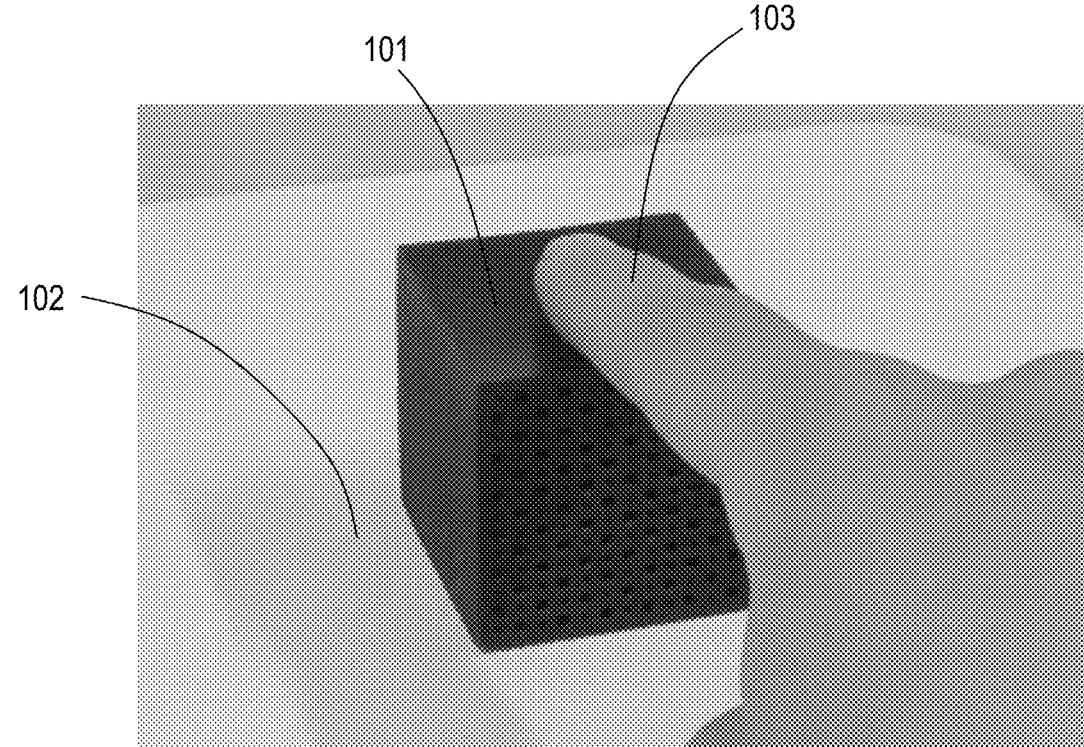
Figure 4:
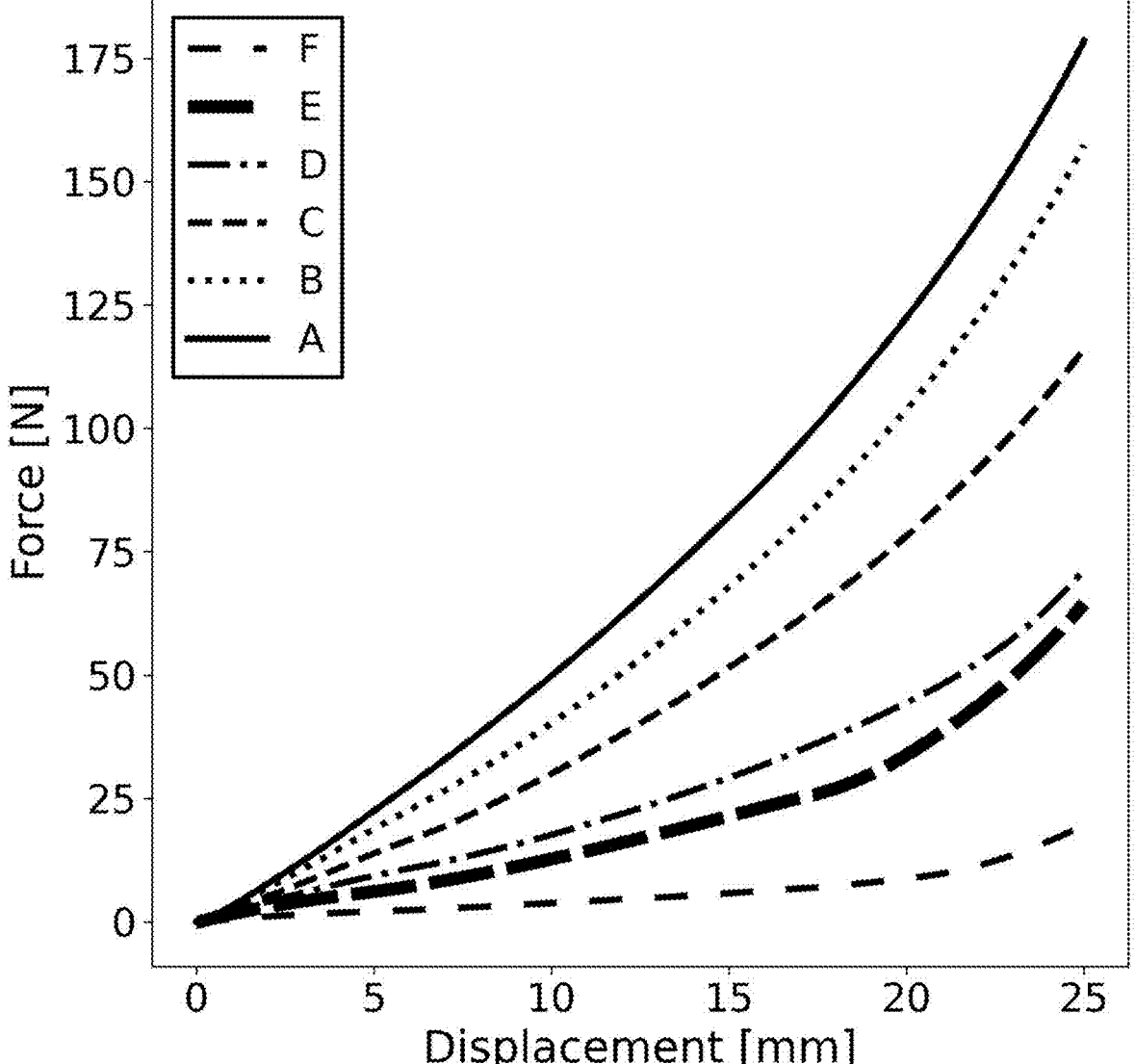
FIG. 4 is a graph illustrating a relationship between magnitude (Force [N]) of a force applied to objects of six types of substances A to F and a displacement amount (Displacement [mm]) of each object by the force.
Figure 5:
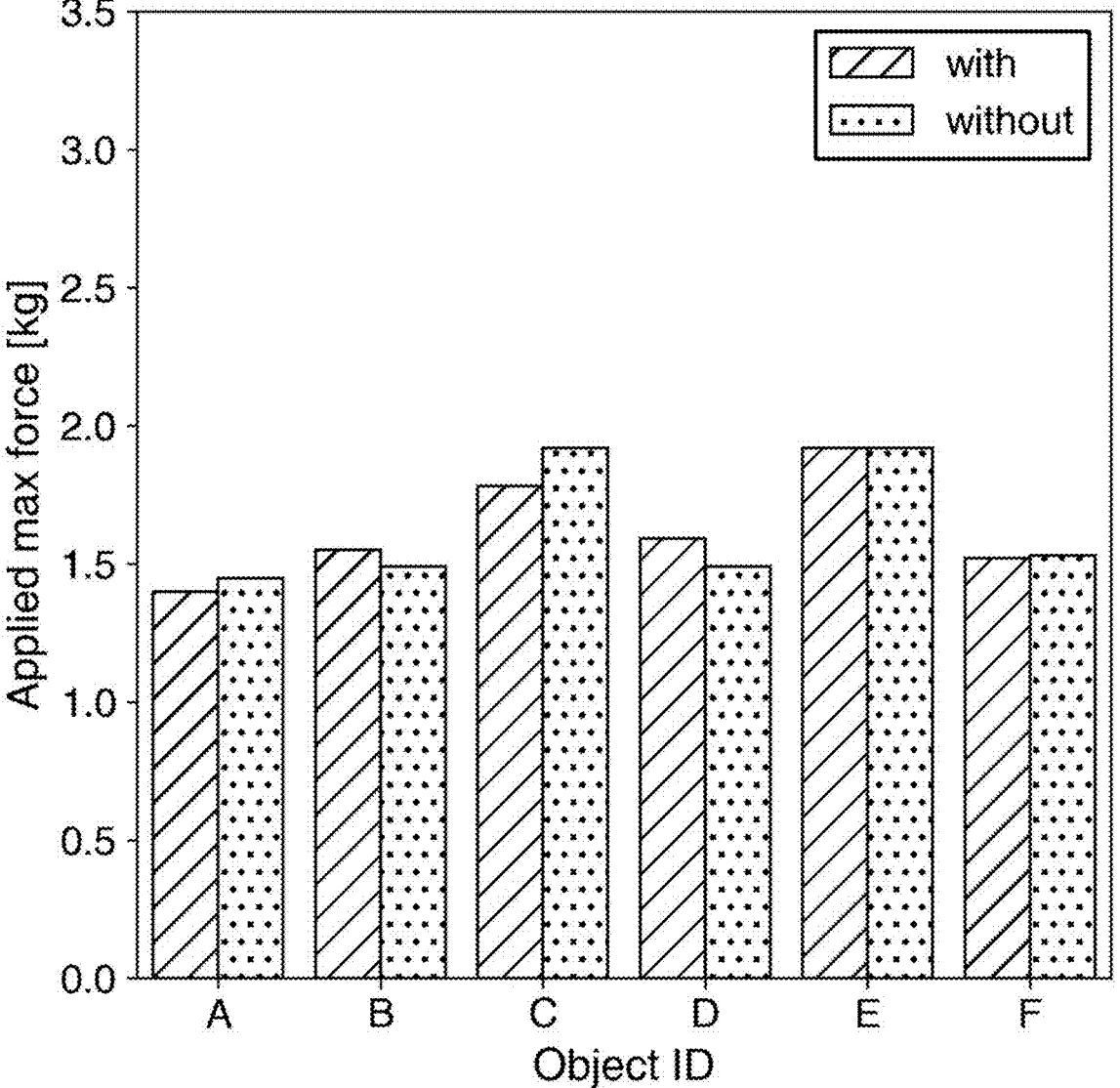
FIG. 5 is a graph illustrating a maximum value (Applied max force [kg]) of the magnitude of the force actually applied from a finger to the objects of the six types of substances A to F when the finger in contact with each object appears to apply the force to the object by being vibrated (with) and when the finger is not vibrated (without) in association with an identifier (Object ID) indicating the substance of each object.
Figure 6:
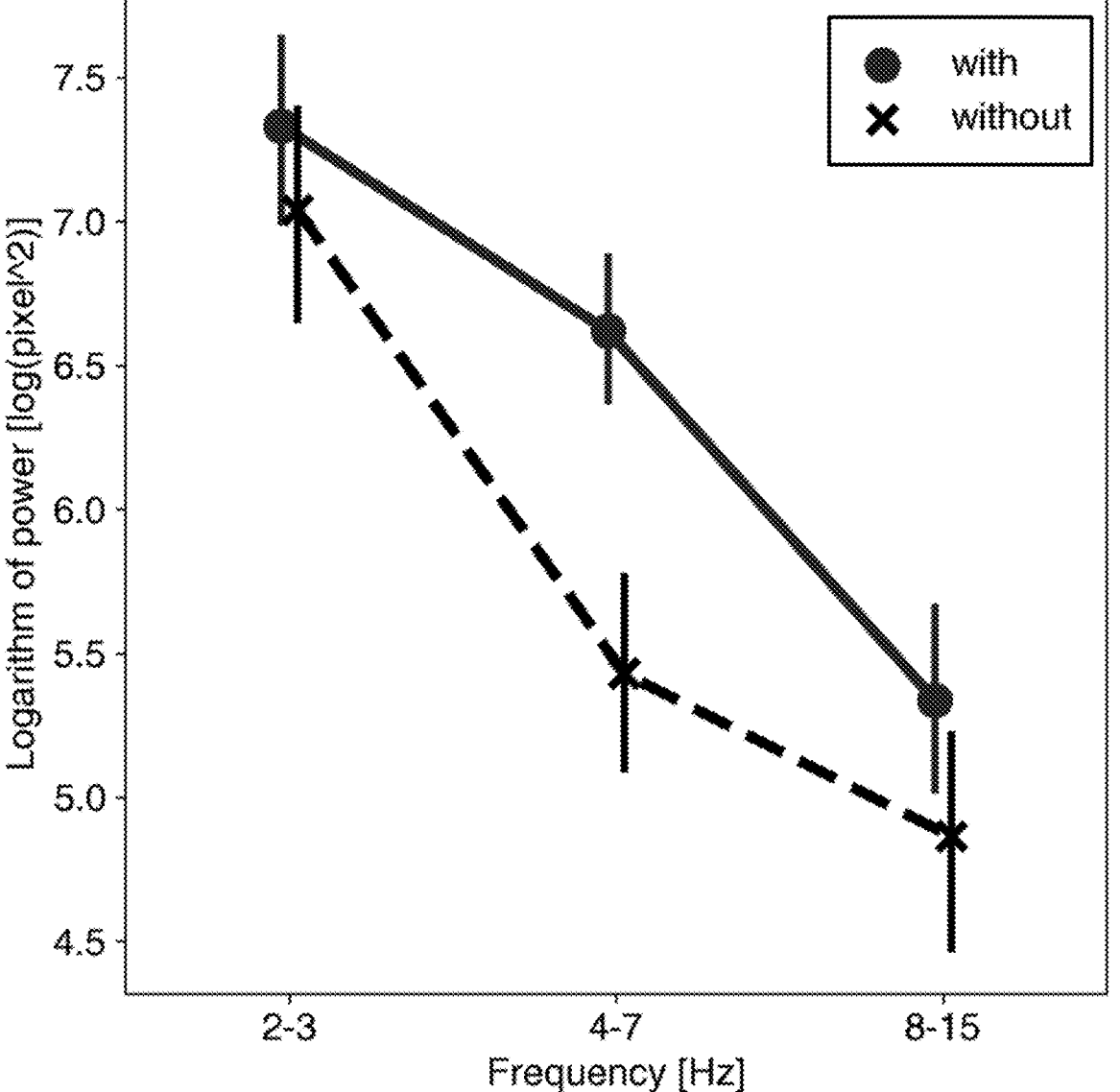
FIG. 6 is a graph illustrating a relationship between logarithmic power (Logarithm of power [log (pixel^2)]) of the frequency component and the frequency (Frequency [Hz]) when a finger in contact with an object appears to apply a force to the object by being vibrated (with) and when the finger is not vibrated (without).

As illustrated in FIGS. 3A and 3B, videos (moving images) illustrating a state in which an elastic body object 101 is arranged on a stage 102 and an upper surface thereof is pressed with a finger 103 are prepared. Note that, in one image (hereinafter, a "video with vibration (with)") (FIG. 3A), the finger 103 arranged on the upper surface of the object 101 vibrates in a direction along the upper surface of the object (for example, in a D direction,). This vibration imitates shaking of the finger 103 generated when the upper surface of the object 101 is strongly pressed with the finger 103, and is performed in a state where a tip of the finger 103 is in contact with the upper surface of the object 101. On the other hand, in the other image (hereinafter, a "video without vibration (without)") (FIG. 3B), the finger 103 arranged on the upper surface of the object 101 does not vibrate. Such "video with vibration (with)" and the "video without vibration (without)" were prepared for the objects 101 of six types of substances A to F having different softness (FIG. 4). Further, as illustrated in FIG. 5, the magnitude of the force (pushing force) actually applied from the finger 103 to the object 101 is the same (about a maximum force of 1.5 [kg]) in the "video with vibration (with)" and the "video without vibration (without)" of any of the substances A to F. FIG. 6 illustrates a relationship between logarithmic power (Logarithm of power [log (pixel^2)]) of a frequency component and a frequency (Frequency [Hz]) of the "video with vibration (with)" and the "video without vibration (without)". As illustrated in FIG. 6, a difference in the logarithmic power of the frequency component between the "video with vibration (with)" and the "video without vibration (without)" becomes large particularly in a frequency range from 4 to 7 Hz, both inclusive. This indicates that the frequency component of the above-described vibration of the finger 103 imitating shaking of the finger 103 mainly includes a component from 4 to 7 Hz, both inclusive. A subject viewed such "video with vibration (with)" and "video without vibration (without)", and answered a subjective evaluation value of the apparent force that the subject feels as being applied to the object 101 from the finger 103 with an integer score of 0~100. Here, the apparent force is larger as the score is larger, and the score 0 indicates that "the subject feels that no force is applied" and the score 100 indicates that "the subject feels that the largest force is applied as can be imagined". Similar experiments were performed for 300 subjects.

Experiment Results

Figure 7:
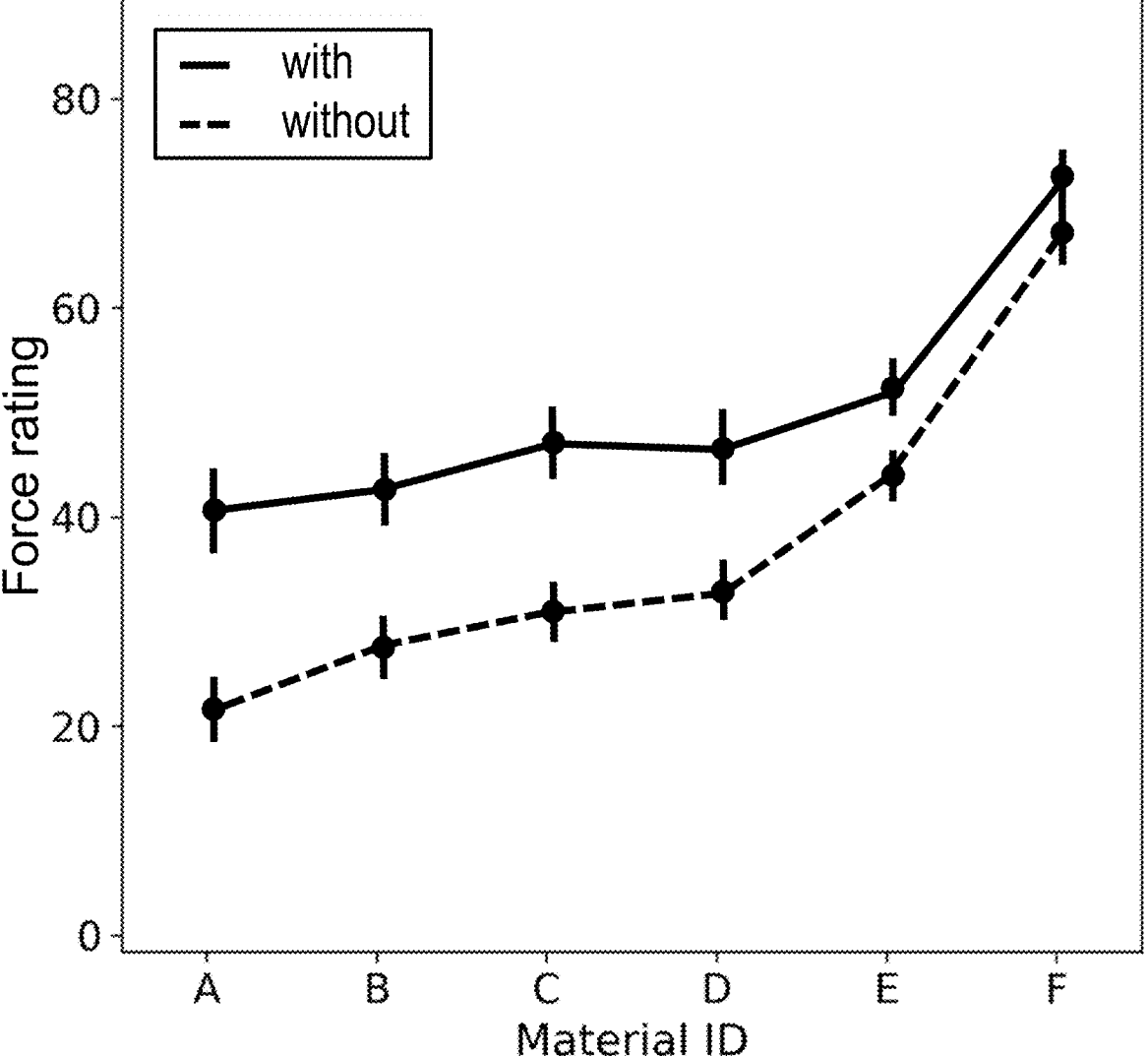
FIG. 7 is a graph illustrating a subjective evaluation value (Force rating) of the magnitude of the apparent force that appears to be applied from a finger to the objects of the six types of substances A to F when the finger in contact with each object appears to apply the force to the object by being vibrated (with) and when the finger is not vibrated (without) in association with the identifier (Object ID) indicating the substance of each object.

FIG. 7 illustrates experimental results. As illustrated in FIG. 7, the subject felt that the apparent force applied from the finger 103 to the object 101 was larger in the case of viewing the "video with vibration (with)" than in the case of viewing the "video without vibration (without)" for the object 101 of any of the substances A to F with any softness. That is, although the magnitude of the actual force applied from the finger 103 to the object 101 was the same (FIG. 5), it was possible to make the subject feel that the apparent force applied from the finger 103 to the object 101 was larger only by vibrating the finger 103 as described above than the case where the finger 103 was not vibrated. Such an effect was able to be confirmed regardless of the softness of the object 101. In addition, it was confirmed that the magnitude of the apparent force perceived by the subject becomes larger as the object 101 is physically softer, and the magnitude of the apparent force perceived by the subject becomes smaller as the object 101 is physically harder. Further, as illustrated in FIG. 6, the frequency component of the vibration of the finger 103 is mainly a component from 4 to 7 Hz, both inclusive (FIG. 6). That is, by vibrating the finger 103 so as to include the vibration component from 4 to 7, both inclusive, it was possible to make the subject feel that a larger force was applied from the finger 103 to the object 101.

Consideration

In the above experiment, it was possible to make the subject feel that a larger force is applied from the finger 103 to the object 101 by vibrating the finger 103 while pressing the upper surface of the object 101 with the finger 103. However, it is conceivable that a similar effect can be obtained regardless of which position of the object 101 the finger 103 is in contact with if the finger 103 vibrates in the state of being in contact with the object 101. Further, a similar effect is expected by vibrating the finger 103 as described above in a state where the finger 103 pulls the object 101, the finger 103 applies shear stress to the object 101, or the finger 103 twists the object 101, instead of pressing the object 101 with the finger 103. Moreover, a similar effect is expected by performing the above-described vibration in the state where the finger 103 is in proximity to any position of the object 101, even if the finger 103 is not in contact with the object 101. Further, a similar effect is expected if the finger 103 or an inclusion vibrates as described above even if the inclusion (for example, a tool, a glove, or the like worn and gripped by a human) is present between the finger 103 and the object 101. Moreover, in this case, a greater effect can be expected by vibrating the finger 103 together with the inclusion. Further, a similar effect is expected in a case where a body part other than the finger is used instead of the finger 103. Further, it is desirable that the finger 103 in contact with or in proximity to the object 101 vibrates, but a greater effect can be expected when a body part (for example, a wrist, an elbow, or the like) distant from the object 101 also vibrates in addition to the finger's vibration. Moreover, a similar effect is expected in a case where a body part of an animal other than a human or a mechanism such as a robot is used instead of the finger 103.

In such a case, a larger effect is expected when the mechanism has a shape imitating a body. Similarly, a similar effect is expected in a case where a substance or an object having a shape other than the above-described object 101 is used instead of the object 101. Further, a similar effect is expected in a case where a body part of a human or an animal other than a human is used instead of the object 101. Further, a similar effect can be obtained by vibrating the finger 103 or the like by image processing instead of using the video obtained by capturing the state in which the finger 103 or the like is actually vibrated. Moreover, a similar effect is expected even when the finger 103 or the like drawn by computer graphics or animation is vibrated. Moreover, a similar effect is expected even when a human browses a real object instead of allowing the human to browse a video. Further, it is desirable that this vibration includes a vibration component from 4 to 7 Hz, both inclusive, but a certain effect can be expected even when this vibration includes a vibration component other than the above vibration component. That is, the vibration may include a vibration component in a wider frequency band including a frequency band of 4 to 7 Hz. Further, although it is desirable that the vibration is periodic, a similar effect is expected even in a case where the vibration is aperiodic. The aperiodic vibration desirably has a frequency of 4 to 7 times, both inclusive, per second. In short, it is possible to make an apparent force appear to be applied from the second presentation visual object to the first presentation visual object by vibrating the second presentation visual object with respect to the first presentation visual object so as to include the vibration component of the specific control frequency, the second presentation visual object being in contact with or in proximity to the first presentation visual object. Note that an example of the control frequency is a frequency from 4 to 7 times, both inclusive, per second, favorably a frequency from 4 to 7 Hz, both inclusive. However, a frequency included in a wider range including these ranges may be the control frequency.

Further, the magnitude of the apparent force can be controlled according to the magnitude (for example, power, amplitude, or absolute value) of the vibration component of the control frequency (for example, the frequency from 4 to 7, both inclusive, per second, favorably the frequency from 4 to 7 Hz, both inclusive). That is, the magnitude of the apparent force can be controlled by controlling the magnitude of the vibration component of the control frequency included in the vibration of the second presentation visual object with respect to the first presentation visual object. For example, the apparent force can be increased when the vibration component of the control frequency is increased, and conversely, the apparent force can be decreased when the vibration component is decreased.

Further, it is possible to vibrate the first presentation visual object so as to present the apparent force of desired magnitude by setting a correspondence (relationship) between the magnitude of the vibration component of the control frequency and the magnitude of the apparent force. That is, information indicating a correspondence between a vibration index representing the magnitude of the vibration component of the control frequency (for example, the frequency from 4 to 7 times, both inclusive, per second, favorably, the frequency from 4 to 7 Hz, both inclusive), and an apparent force index representing the magnitude of the apparent force that appears to be applied from the second visual object to the first visual object by vibrating the second visual object with respect to the first visual object so as to include the vibration component of the control frequency of the magnitude represented by the vibration index, the second visual object being in contact with or in proximity to the first visual object. It is possible to designate the vibration index corresponding to the apparent force index indicating the designated magnitude of the apparent force, and it is possible to obtain the magnitude of the vibration component of the control frequency necessary for presenting the designated magnitude of the apparent force by using the information indicating the correspondence.

Further, it is possible to independently apply the apparent force to each of a plurality of presentation visual objects. That is, the apparent force is made appear to be applied from the second presentation visual object to the first presentation visual object by vibrating the second presentation visual object with respect to the first presentation visual object so as to include the vibration component of the specific control frequency, the second presentation visual object being in contact with or in proximity to the first presentation visual object. In addition, the apparent force may be made appear to be applied from a fourth presentation visual object to a third presentation visual object presented together with the first presentation visual object by vibrating the fourth presentation visual object with respect to the third presentation visual object so as to include the vibration component of the control frequency, the fourth presentation visual object being in contact with or in proximity to the third presentation visual object. At this time, the magnitude of the vibration component of the control frequency included in the vibration of the second presentation visual object with respect to the first presentation visual object and the magnitude of the vibration component of the control frequency included in the vibration of the fourth presentation visual object with respect to the third presentation visual object may be independently controlled. As a result, it is possible to control the magnitude of the apparent force that appears to be applied from the second presentation visual object to the first presentation visual object and the magnitude of the apparent force that appears to be applied from the fourth presentation visual object to the third presentation visual object independently of each other.

Moreover, the magnitude of the apparent force perceived by the subject increases as the first presentation visual object (for example, the object 101) in a real space in which the subject becomes the object is physically softer, and the magnitude of the apparent force perceived by the subject decreases as the first presentation visual object in the real space is physically harder. Therefore, it is possible to widen a control range of the magnitude of the apparent force that can be presented by setting the softness of the first presentation visual object in the real space to be selectable in addition to the magnitude of the vibration component of the control frequency.

First Embodiment

A first embodiment will be described. In the present embodiment, an example in which each presentation visual object is a video, and an apparent force is presented by vibrating a specific presentation visual object so as to include a vibration component of a specific control frequency in the video will be described. Note that, in the following description, the same reference numerals may be cited to simplify description for matters already described.

Configuration

Figure 1:
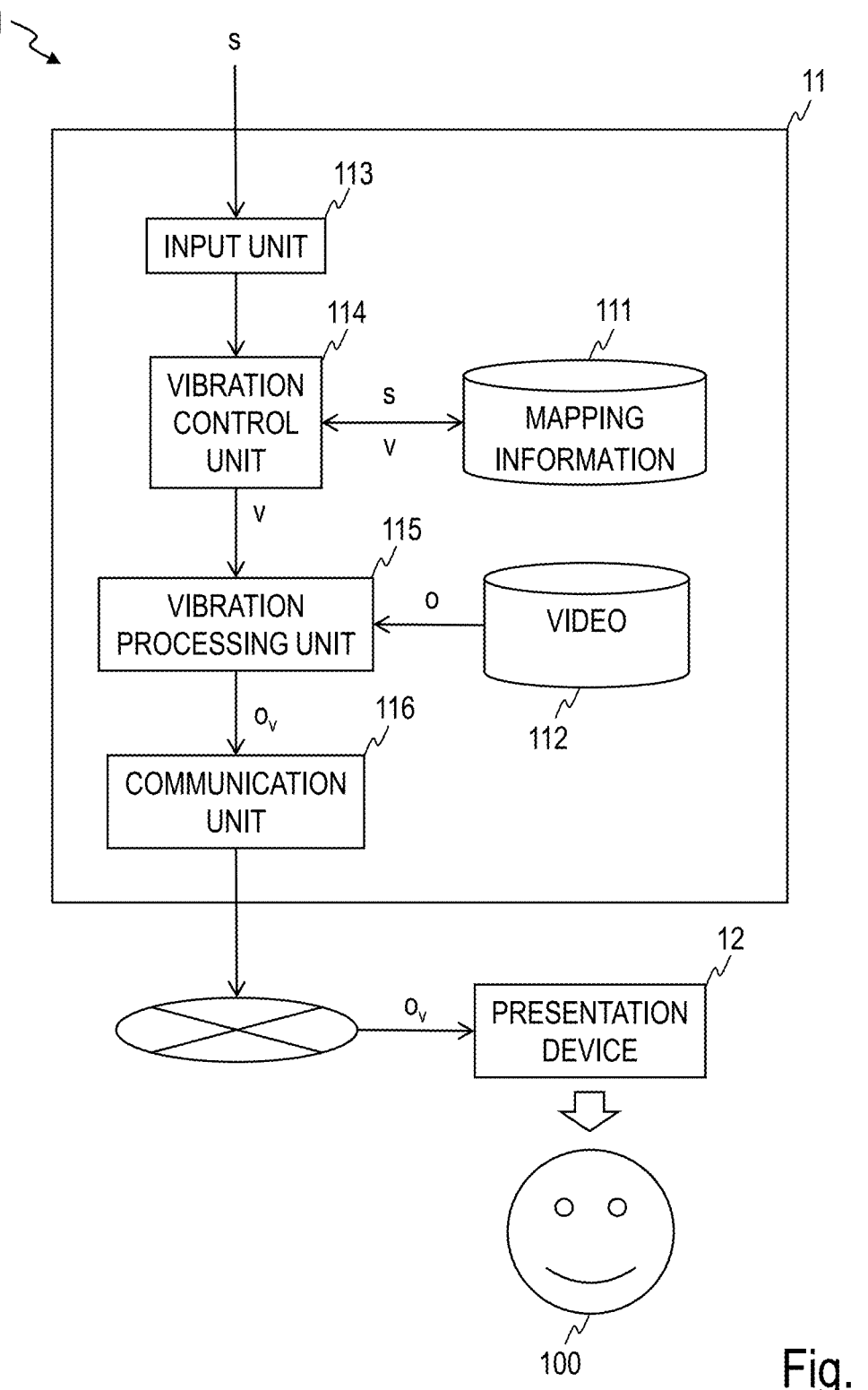
FIG. 1 is a block diagram illustrating, as an example, a configuration of an apparent force presentation system 1 according to the first embodiment.

As illustrated in FIG. 1, an apparent force presentation system 1 according to the present embodiment includes an apparent force control device 11 and a presentation device 12. These devices present an apparent force to a user 100 (human) and further control magnitude of the apparent force (a magnitude feeling of the apparent force). In the present embodiment, an example in which the apparent force control device 11 and the presentation device 12 are configured to be communicable via a network will be described. However, this example does not limit the present invention. The apparent force control device 11 includes storage units 111 and 112, an input unit 113, a vibration control unit 114, a vibration processing unit 115, and a communication unit 116. A hardware configuration of the apparent force control device 11 will be described below. The presentation device 12 is a device that visually presents a video to the user 100. Examples of the presentation device 12 include a display, a projector, and VR goggles.

<Preprocessing>

As preprocessing, the storage unit 112 stores a video (moving image) including a first presentation visual object and a second presentation visual object in contact with or in proximity to the first presentation visual object. The first presentation visual object is an object to which an apparent force appears to be applied from the second presentation visual object. The second presentation visual object is an object that appears to apply an apparent force to the first presentation visual object. The first presentation visual object and the second presentation visual object may be stationary, or at least one of them may be moving. For example, the second presentation visual object may be stationary, moving, rotating, deformed, vibrating with respect to the first presentation visual object, or a combination thereof. Similarly, the first presentation visual object may be stationary, moving, rotating, deformed, or a combination thereof. Furthermore, the first presentation visual object may have a motion according to the motion of the second presentation visual object. For example, the first presentation visual object may be deformed in a moving direction of the second presentation visual object along with the movement of the second presentation visual object. For example, the second presentation visual object may move to the side of the first presentation visual object, and accordingly, a portion of the first presentation visual object that is in contact with or in proximity to the second presentation visual object may be deformed in the moving direction of the second presentation visual object (for example, the portion of the first presentation visual object may be deformed so as to be recessed in the moving direction). Conversely, the second presentation visual object may move in a direction away from the first presentation visual object, and accordingly, a portion of the first presentation visual object that is in contact with or in proximity to the second presentation visual object may be deformed in the moving direction of the second presentation visual object (for example, the portion of the first presentation visual object may be deformed so as to extend in the moving direction). An example of the first presentation visual object is the above-described object 101, and an example of the second presentation visual object is the above-described finger 103. However, these do not limit the present invention. For example, the first presentation visual object may be any substance or substance having any shape, may be a body part of a human or an animal other than a human, or may be a combination thereof. For example, the second presentation visual object may be a body part of a human, may be a body part of an animal other than a human or a mechanism such as a robot, may be an object such as a tool or a glove worn or gripped by a human, or may be any combination thereof. Note that, in the case where the second presentation visual object is a mechanism, it is desirable that at least a part thereof has a shape imitating a human. In this video, the second presentation visual object may be pressed against the first presentation visual object, the second presentation visual object may pull the first presentation visual object, the second presentation visual object may apply shear stress to the first presentation visual object, or the second presentation visual object may twist the first presentation visual object. For example, in this video, the body part (second presentation visual object) of a human may be pressed against the object (first presentation visual object) (for example, FIGS. 3A and 3B), may pull the object (first presentation visual object), may apply the shearing stress to the object (first presentation visual object), or may perform a combined motion thereof. For example, in this video, the body part of a human may press an inclusion (second presentation visual object) such as a tool against the object (first presentation visual object), may pull the object (first presentation visual object) via the inclusion (second presentation visual object), may apply shear stress to the object (first presentation visual object) via the inclusion (second presentation visual object), or may perform a combined motion thereof. Further, the video stored in the storage unit 112 is, for example, a moving image (a moving image having a plurality of frames) obtained by capturing the first presentation visual object and the second presentation visual object that are real objects. However, this does not limit the present invention. For example, a video (moving image) including the first presentation visual object and the second presentation visual object drawn with computer graphics or animation may be stored in the storage unit 112. Further, the video may be a two-dimensional video or a three-dimensional video.

Further, mapping information is stored in the storage unit 111. The mapping information is information indicating a correspondence (relationship) between an index (vibration index) representing the magnitude of the vibration component of the specific control frequency, and an index (apparent force index) representing the magnitude of the apparent force that appears to be applied from the second visual object to the first visual object by vibrating the second visual object with respect to the first visual object so as to include the "vibration component of the control frequency" of the magnitude represented by the vibration index, the second visual object being in contact with or in proximity to the first visual object. The control frequency is, for example, a frequency from 4 to 7 times, both inclusive, per second, favorably a frequency from 4 to 7 Hz, both inclusive. The correspondence between the vibration index and the apparent force index is based on a result obtained in advance by an experiment for a human. For example, the second presentation visual object in contact with or in proximity to the first presentation visual object in the video is vibrated with respect to the first presentation visual object, the magnitude (for example, power, amplitude, or absolute value) of the vibration component of the control frequency included in the vibration is variously changed, and the magnitude of the apparent force perceived by the human who views the vibration is answered (see, for example, the experiments described above). The mapping information may be set on the basis of the correspondence relationship (see, for example, FIG. 7) between the magnitude of the vibration component of the control frequency and the magnitude of the apparent force obtained as a result. For example, the magnitude of the apparent force perceived in a case where the magnitude of the vibration component of the control frequency included in the vibration of the second presentation visual object with respect to the first presentation visual object is a first value is larger than the magnitude of the apparent force perceived in a case where the magnitude of the vibration component of the control frequency is a second value smaller than the first value. Therefore, the magnitude of the apparent force represented by the apparent force index associated with the vibration index representing that the magnitude of the vibration component of the control frequency is the first value is larger than the magnitude of the apparent force represented by the apparent force index associated with the vibration index representing that the magnitude of the vibration component of the control frequency is the second value. For example, a vibration index representing a larger "vibration component of the control frequency" is associated with an apparent force index representing a larger vibration index.

The vibration index may be any index representing the magnitude of the vibration component of the control frequency included in the vibration. For example, the vibration index may be the magnitude (for example, power, amplitude, or absolute value) of a component corresponding to the control frequency of the video in a spatial frequency domain, may be a relative value of the magnitude of the component with respect to a reference value, or may be a function value (for example, a logarithmic value, a monotonically increasing function value, or a non-decreasing function value) of the magnitude and/or the relative value of the component. The reference value may be any value. For example, the reference value may be the magnitude itself of the vibration component of the control frequency in the video stored in the storage unit 112, or may be a predetermined value.

The apparent force index may be any index as long as the index represents the magnitude of the apparent force that appears to be applied from the second visual object to the first visual object by vibrating the second visual object with respect to the first visual object so as to include the "vibration component of the control frequency" having the magnitude represented by the vibration index. For example, an average value or another statistical value of the score of the apparent force may be used as the apparent force index, a relative value of the average value or another statistical value of the score of the apparent force with respect to the reference value may be used as the apparent force index, or a function value (for example, a monotonically increasing function value or a non-decreasing function value) of the average value or another statistical value and/or the relative value of the score may be used as the apparent force index. The score of the apparent force may be any value as long as the value objectively expresses the apparent force. For example, the score of the apparent force described in the experiment can be used. The score in this example of an integer of 0 to 100, and the apparent force is larger as the score is larger, and the score 0 indicates that "the subject feels that no force is applied" and the score 100 indicates that "the subject feels that the largest force is applied as can be imagined". In addition, the score of the apparent force may be a value in five stages or seven stages. Alternatively, a physical quantity equivalent to the apparent force perceived from the first visual object and the second visual object may be defined by a psychophysical experiment, and the physical quantity equivalent to the apparent force or a function value thereof may be used as the apparent force index. For example, a video of a state in which a finger pressed against an object is vibrating may be observed by a subject, a measuring instrument may be pressed with a force equal to the apparent force perceived by the subject from the video, and an average value or another statistical value of measurement results (for example, a physical quantity in kg or N), or a function value thereof may be defined as the apparent force index representing the apparent force corresponding to the magnitude of the vibration component of the control frequency included in the vibration of the finger in the video.

Figures 2A, 2B:
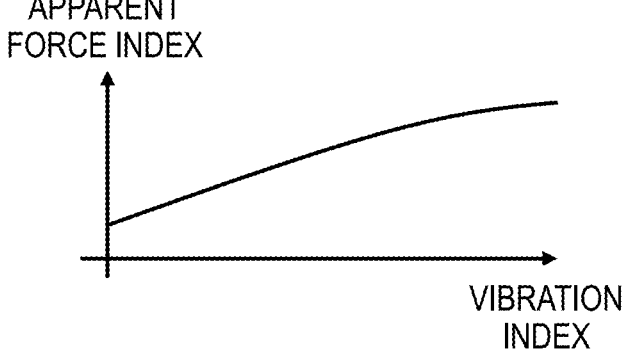
FIGS. 2A and 2B are a table and a graph illustrating mapping information indicating a correspondence between a vibration index (for example, an index representing magnitude of a vibration frequency component [log (pixel^2)] of 4-7 Hz) representing magnitude of a vibration component of a control frequency, and an apparent force index (an index representing magnitude of an apparent force) representing magnitude (force magnitude feeling) of an apparent force that appears to be applied from a second visual object to a first visual object by vibrating the second visual object with respect to the first visual object, the second visual object being in contact with or in proximity to the first visual object, so as to include the vibration component of the control frequency of the magnitude represented by the vibration index.

The mapping information may be any information as long as the information indicates a correspondence (relationship) between the vibration index and the apparent force index. For example, as illustrated in FIG. 2A, a table in which the vibration index and the apparent force index corresponding thereto are associated with each other may be used as the mapping information. FIG. 2A is an example in which logarithmic power of a vibration frequency component from 4 to 7 Hz, both inclusive, included in the vibration of the second visual object with respect to the first visual object is used as the vibration index, and the relative value of the score average value or another statistical value representing the apparent force applied from the second presentation visual object to the first presentation visual object is used as the apparent force index. Further, for example, as illustrated in FIG. 2B, a function (mathematical model) indicating the correspondence (relationship) between the vibration index and the apparent force index corresponding thereto may be used as the mapping information. Such a function is obtained by, for example, machine learning using, as training data, a correspondence relationship between the magnitude of the vibration component of the control frequency obtained in the experiment and the score of the apparent force (for example, a set of the magnitude of the vibration component of the control frequency and the score of the apparent force).

<Vibration Control Processing>

Vibration control processing is executed on the premise of the above-described preprocessing. The vibration control processing is processing in which the vibration control unit 114 of the apparent force control device 11 (FIG. 1) obtains and outputs vibration control information v for vibrating the second presentation visual object with respect to the first presentation visual object so as to include the vibration component of the specific control frequency, the second presentation visual object being in contact with or in proximity to the first presentation visual object, and making the apparent force appear to be applied from the second presentation visual object to the first presentation visual object. As described above, the vibration control information v includes information for controlling the magnitude of the vibration component of the control frequency included in the vibration of the second presentation visual object with respect to the first presentation visual object. Details will be described below.

First, designation information s for designating the magnitude of the apparent force to be presented is input to the input unit 113 of the apparent force control device 11 (FIG. 1). The designation information s may be input by the user 100 or the like operating a button, a keyboard, or the like (not illustrated), may be sent from another application, may be transmitted from an outside by communication, or may be stored in advance in a memory (not illustrated) of the apparent force control device 11. The designation information s may be any information that designates the magnitude of the apparent force. The designation information s may be, for example, the apparent force index itself, information for specifying the apparent force index, the score of the apparent force, the physical quantity equivalent to the apparent force, or information for specifying the score of the apparent force or the physical quantity equivalent to the apparent force. The input unit 113 receives the input designation information s and sends the designation information s to the vibration control unit 114 (step S113).

The designation information s is input to the vibration control unit 114. The vibration control unit 114 obtains and outputs the vibration control information v indicating the magnitude of the vibration component of the control frequency represented by the vibration index corresponding to the apparent force index representing the magnitude of the apparent force designated by the designation information s, using the mapping information (information indicating the correspondence between the vibration index representing the magnitude of the vibration component of the control frequency and the apparent force index representing the magnitude of the apparent force that appears to be applied from the second visual object to the first visual object by vibrating the second visual object with respect to the first visual object so as to include the vibration component of the control frequency of the magnitude represented by the vibration index, the second visual object being in contact with or in proximity to the first visual object) stored in the storage unit 111. For example, in the case where the mapping information is the table (for example, FIG. 2A) in which the vibration index and the apparent force index corresponding thereto are associated with each other, the vibration control unit 114 searches the mapping information, and obtains and outputs the vibration control information v indicating the magnitude of the vibration component of the control frequency represented by the vibration index, the vibration control information v corresponds to the apparent force index representing the magnitude of the apparent force designated by the designation information s. For example, in the case where the mapping information is the function indicating the correspondence (relationship) between vibration index and the apparent force index corresponding thereto, the vibration control unit 114 substitutes the apparent force index representing the magnitude of the apparent force designated by the designation information s into the function, thereby obtaining the vibration index, and obtains and outputs the vibration control information v indicating the magnitude of the vibration component of the control frequency represented by the vibration index. The vibration control information v is sent to the vibration processing unit 115 (step S114).

The vibration control information v is input to the vibration processing unit 115. The vibration processing unit 115 performs image processing (processing) for the video o extracted from the storage unit 112 on the basis of the vibration control information v, and obtains and outputs a video $o_v$ (presentation visual object) displaying the state in which the second presentation visual object vibrates with respect to the first presentation visual object so as to include the "vibration component of the control frequency" having the magnitude based on the vibration control information v. That is, the vibration processing unit 115 obtains and outputs the video $o_v$ (presentation visual object) displaying the state in which the second presentation visual object vibrates with respect to the first presentation visual object so as to include the vibration component of the control frequency on the basis of the vibration control information v.

For example, first, the vibration processing unit 115 specifies a region (for example, a region of a body part, such as the finger 103 of FIGS. 3A and 3B) of the second presentation visual object present in the extracted video o. For example, the vibration processing unit 115 detects a flesh color region from the extracted video o as the region of the body part, and distinguishes the region of the body part (second presentation visual object) from the other region in the video. Alternatively, the user 100 may interactively select the region of the second presentation visual object (for example, the body part or the like) from the input unit 113 as a pixel group. In addition, the vibration processing unit 115 may not only two-dimensionally recognize the second presentation visual object (for example, the body part or the like) in the video, but also three-dimensionally recognize the second presentation visual object including a posture.

Next, the vibration processing unit 115 vibrates at least a part of the region of the second presentation visual object in the video o with respect to the other region (including the first presentation visual object) so as to include the "vibration component of the control frequency" having the magnitude based on the vibration control information v and obtains the video $o_v$ by the image processing. For example, the vibration processing unit 115 vibrates the region of the second presentation visual object specified as described above at a frequency including the control frequency (for example, a frequency from 4 to 7 Hz, both inclusive). This vibration may be periodic or aperiodic. Further, the vibration may be two-dimensional vibration or three-dimensional vibration. A vibration direction is not limited. For example, at least the part of the region of the second presentation visual object may be vibrated in a direction (first direction) along a straight line connecting the first presentation visual object and the second presentation visual object, may be vibrated in a direction (for example, orthogonal direction) (second direction) intersecting the straight line, or may be vibrated in a direction including a first direction component and a second direction component. The entire region of the second presentation visual object may be vibrated, or only a part of the region may be vibrated. For example, only a region on the side of the first presentation visual object, of the region of the second presentation visual object, may be vibrated. For example, in the case where the second presentation visual object is a body part (for example, a finger or the like), only a region on the side of the first presentation visual object (for example, a fingertip or the like) may be vibrated. Conversely, only a region distant from the side of the first presentation visual object, of the region of the second presentation visual object, may be vibrated. For example, in the case where the second presentation visual object includes a body part (finger or the like) and an inclusion (tool or the like), and the inclusion is in contact with or in proximity to the first presentation visual object (for example, an object), only the inclusion portion may be vibrated. Moreover, the body part may also be vibrated in response to the vibration of the inclusion portion. In addition, the second presentation visual object may vibrate uniformly or may not vibrate uniformly. For example, the power of the vibration in a region closer to the side of the first presentation visual object, of the region of the second presentation visual object, may be larger than the power of the vibration in a region distant from the first presentation visual object than the region.

For example, the vibration processing unit 115 amplifies the vibration component of the frequency in a range including the control frequency of the second presentation visual object of the video o to obtain the video $o_v$. The frequency in the range including the control frequency may be all the control frequencies or may be a frequency included in a range wider than the range including all the control frequencies. Alternatively, in a case where the second presentation visual object of the video o is originally vibrating, the vibration processing unit 115 may obtain the image $o_v$ by suppressing at least a part of the vibration component of other than the control frequency of the second presentation visual object of the video o, for example. In this case, for example, the vibration processing unit 115 may obtain the video $o_v$ by amplifying or suppressing the vibration component of a frequency in the range including the control frequency of the second presentation visual object of the video o and suppressing a predetermined vibration component f other than the control frequency. The magnitude of the vibration component of the control frequency included in the video $o_v$ is controlled on the basis of the vibration control information v. The magnitude of the vibration component of the control frequency indicated by the vibration control information v may be used as it is as the magnitude of the vibration component of the control frequency included in the video $o_v$, or the magnitude of the vibration component of the control frequency indicated by the vibration control information v or the magnitude approximate thereto may be used as the magnitude of the vibration component of the control frequency included in the video $o_v$. The magnitude of the vibration component of the control frequency indicated by the vibration control information v may be used as it is as the magnitude of the vibration component of the control frequency in the region of the second presentation visual object, or the magnitude of the vibration component of the control frequency indicated by the vibration control information v or the magnitude approximate thereto may be used as the magnitude of the vibration component of the control frequency in the region of the second presentation visual object. That is, the "magnitude based on the vibration control information v" may be the magnitude of the vibration component of the control frequency indicated by the vibration control information v, or may be the magnitude approximate to the magnitude. Note that the adjustment of the magnitude of the vibration component of the control frequency with respect to the region of the second presentation visual object included in the video o is performed, for example, as follows. First, the vibration processing unit 115 converts the region of the second presentation visual object into a signal in the spatial frequency domain. Next, the vibration processing unit 115 amplifies or suppresses a control frequency component of the signal in the spatial frequency domain to obtain an adjusted signal. Moreover, the vibration processing unit 115 returns the adjusted signal to the spatial frequency domain to obtain an adjusted region of the second presentation visual object. Then, the vibration processing unit 115 combines the adjusted region of the second presentation visual object with the original video to obtain the video $o_v$. At the time of this composition, the region of the second presentation visual object included in the original video o may be removed or suppressed (step S115).

The video $o_v$ output from the vibration processing unit 115 may be stored in the storage unit 112 as a new video o, may be transmitted to the outside via the communication unit 116, or may be further transmitted to the presentation device 12 (for example, may be sent to presentation device 12 in real time). When the video $o_v$ including the presentation visual object is sent to the presentation device 12, the presentation device 12 visually outputs (displays) the video $o_v$, and the user 100 views the video $o_v$. As a result, the user 100 perceives the apparent force of the magnitude designated by the designation information s (step S116).

Modification 1 of First Embodiment

Videos obtained by capturing a plurality of the first presentation visual objects (objects) having different physical softness together with the second presentation visual object may be stored in the storage unit 112. As a result, the apparent force control device 11 can generate the video $o_v$ by selecting the physical softness of the original first presentation visual object serving as the subject in addition to the control of the magnitude of the vibration component of the control frequency included in the vibration of the second presentation visual object with respect to the first presentation visual object. In this case, the designation information s may include information for designating the physical softness of the original first presentation visual object, or this information may be input to the apparent force control device 11 independently of the designation information s or may be stored in a memory (not illustrated) in advance. The vibration control information v and the information for designating physical softness of the original first presentation visual object are input to the vibration processing unit 115. The vibration processing unit 115 extracts the video o obtained by capturing the object having designated physical softness from the storage unit 112 using the stored information. The vibration processing unit 115 performs, for the extracted video o, the image processing based on the vibration control information v, vibrates the region of the second presentation visual object in the video o with respect to the other region (including the first presentation visual object) so as to include the "vibration component of the control frequency" having the magnitude based on the vibration control information v and obtains the video $o_v$, as described in the first embodiment. As a result, the control range of the magnitude of the apparent force to be presented can be further widened (FIG. 7).

Modification 2 of First Embodiment

The video $o_v$ may be obtained by performing the image processing so that the apparent force is independently applied to each of a plurality of presentation visual objects included in the video o. As a result, a different apparent force can be perceived for each presentation visual object. In this case, the video o stored in the storage unit 112 includes not only the first presentation visual object and the second presentation visual object in contact with or in proximity to the first presentation visual object, but also at least a third presentation visual object presented together with the first presentation visual object and a fourth presentation visual object in contact with or in proximity to the third presentation visual object. A specific example of the third presentation visual object is the same as the specific example of the first presentation visual object described above, and a specific example of the fourth presentation visual object is the same as the specific example of the second presentation visual object described above. At least the designation information s including first designation information designating the apparent force that appears to be applied from the second presentation visual object to the first presentation visual object, and second designation information designating the apparent force that appears to be applied from the fourth presentation visual object to the third presentation visual object are input to the input unit 113. The input unit 113 receives the input designation information s and sends the designation information s to the vibration control unit 114.

The vibration control unit 114 obtains first vibration control information indicating the magnitude of the vibration component of the control frequency represented by the vibration index, corresponding to the apparent force index representing the magnitude of the apparent force designated by the first designation information of the designation information s, using the mapping information stored in the storage unit 111. Moreover, the vibration control unit 114 obtains second vibration control information indicating the magnitude of the vibration component of the control frequency represented by the vibration index, corresponding to the apparent force index representing the magnitude of the apparent force designated by the second designation information of the designation information s, using the mapping information stored in the storage unit 111. The vibration control unit 114 outputs the vibration control information v including the first vibration control information and the second vibration control information. Such vibration control information v is information independently controlling the magnitude of the vibration component of the control frequency included in the vibration of the second presentation visual object with respect to the first presentation visual object and the magnitude of the vibration component of the control frequency included in the vibration of the fourth presentation visual object with respect to the third presentation visual object. The vibration control information v is input to the vibration processing unit 115. The vibration processing unit 115 performs the image processing for the video o extracted from the storage unit 112 on the basis of the vibration control information v, and obtains and outputs a video $o_v$ (presentation visual object) displaying a state in which the second presentation visual object vibrates with respect to the first presentation visual object so as to include the "vibration component of the control frequency" having the magnitude based on the first vibration control information of the vibration control information v, and the fourth presentation visual object vibrates the third presentation visual object so as to include the "vibration component of the control frequency" having the magnitude based on the second vibration control information of the vibration control information v. A method of generating a video in which the second presentation visual object vibrates with respect to the first presentation visual object so as to include the "vibration component of the control frequency" having the magnitude based on the first vibration control information is as described in the first embodiment except that the vibration control information v is replaced with the first vibration control information. A method of generating a video in which the fourth presentation visual object vibrates with respect to the third presentation visual object so as to include the "vibration component of the control frequency" having the magnitude based on the second vibration control information is as described in the first embodiment except that the vibration control information v is replaced with the second vibration control information, and the first and second presentation visual objects are replaced with the third and fourth presentation visual objects. Other pieces of processing are the same as those of the first embodiment. Furthermore, in addition to the above processing, it may be possible to generate the video $o_v$ by selecting physical softness of the original first presentation visual object serving as the subject, as in the modification 1 of the first embodiment. As a result, it is possible to further widen the control range of the magnitude of the apparent force to be presented.

Modification 3 of First Embodiment

In the first embodiment and the modifications 1 and 2 thereof, the vibration processing unit 115 has performed the image processing for the video o on the basis of the vibration control information v, and has obtained the video $o_v$ displaying the state in which the second presentation visual object vibrates with respect to the first presentation visual object so as to include the "vibration component of the control frequency" having the magnitude based on the vibration control information v. However, the video $o_v$ displaying the state in which the second presentation visual object vibrates with respect to the first presentation visual object so as to include the "vibration component of the control frequency" having the magnitude based on the vibration control information v may be stored in advance in the storage unit 112. In this case, the vibration processing unit 115 obtains, using the vibration control information v, the video $o_v$ by selecting and extracting the video $o_v$ from the video o stored in the storage unit 112, the video $o_v$ displaying the state in which the second presentation visual object vibrates with respect to the first presentation visual object so as to include the "vibration component of the control frequency" having the magnitude based on the vibration control information v. As a result, it is possible to shorten the time for obtaining the video $o_v$.

Second Embodiment

In the first embodiment and the modifications 1 to 3 of the first embodiment, the apparent force control device has outputted the video $o_v$ displaying the state in which the second presentation visual object vibrates with respect to the first presentation visual object so as to include the vibration component of the control frequency on the basis of the vibration control information v. However, the apparent force control device may obtain and output a command for vibrating the second presentation visual object with respect to the first presentation visual object so as to include the vibration component of the control frequency on the basis of the vibration control information v.

Configuration

Figure 8:
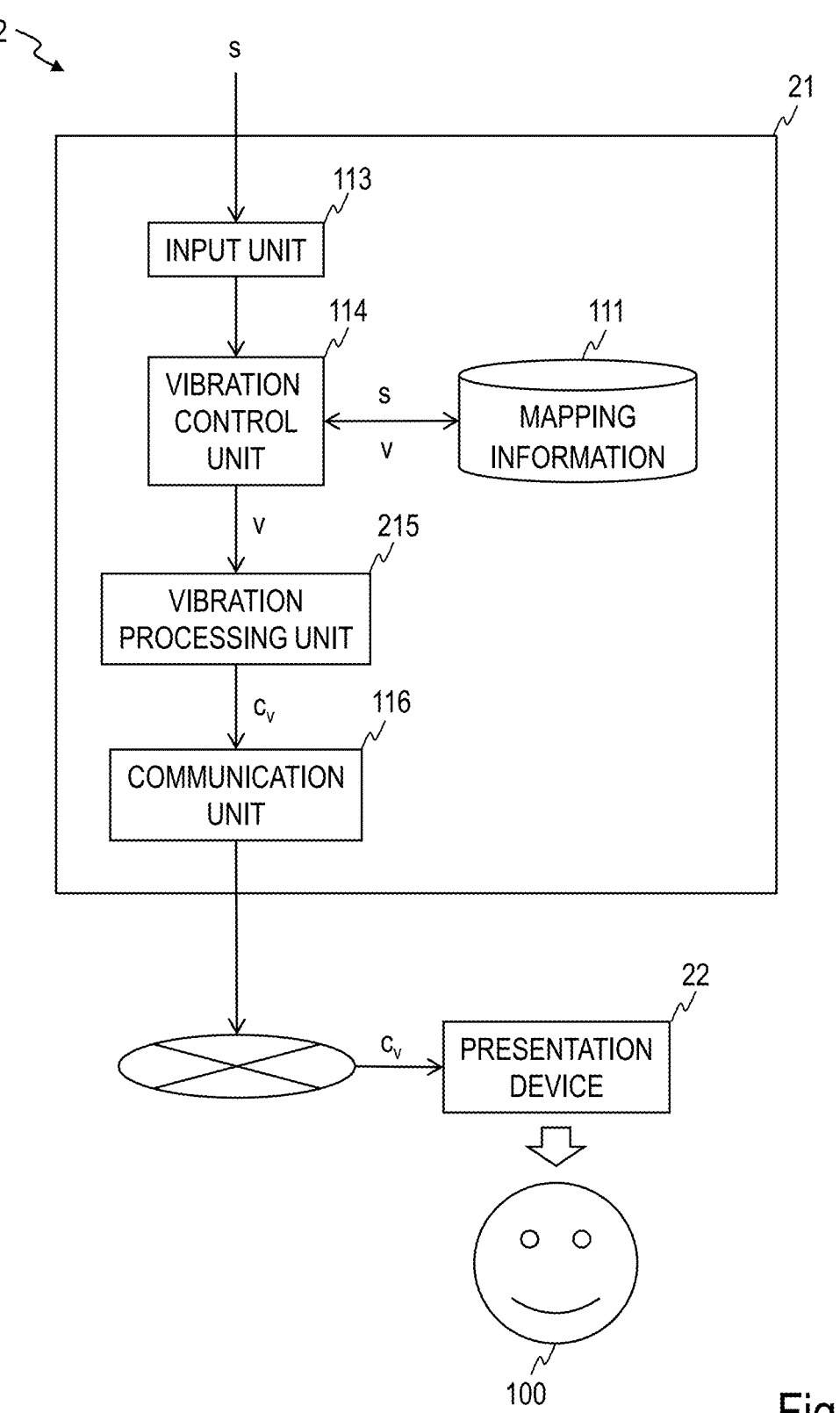
FIG. 8 is a block diagram illustrating, as an example, a configuration of an apparent force presentation system 2 according to a second embodiment.

As illustrated in FIG. 8, an apparent force presentation system 2 of the present embodiment includes an apparent force control device 21 and a presentation device 22. In the present embodiment, an example in which the apparent force control device 21 and the presentation device 22 are configured to be communicable via a network will be described. However, this example does not limit the present invention. The apparent force control device 21 includes a storage unit 111, an input unit 113, a vibration control unit 114, a vibration processing unit 215, and a communication unit 116. A hardware configuration of the apparent force control device 21 will be described below. The presentation device 22 may be a device that visually presents a video to a user 100, or may be a device that visually presents a mechanical motion to the user 100. Examples of the former presentation device 22 include a display, a projector, and VR goggles. Examples of the latter presentation device 22 include devices such as a testing machine, a robot, a toy, and a product demonstrator capable of vibrating an object (second presentation visual object) with respect to another object (first presentation visual object) at a designated vibration frequency.

<Preprocessing>

As preprocessing, mapping information described in the first embodiment is stored in the storage unit 111.

<Vibration Control Processing>

The following vibration control processing is executed on the premise of the above-described preprocessing. First, the apparent force control device 21 executes processing of steps S113 and S114 described in the first embodiment.

Vibration control information v obtained in step S114 is input to the vibration processing unit 215. The vibration processing unit 215 obtains and outputs a command $c_v$ for vibrating a second presentation visual object with respect to a first presentation visual object so as to include a "vibration component of a control frequency" having magnitude based on the vibration control information v (step S215). The command $c_v$ is transmitted to the outside via the communication unit 116, and is further transmitted to the presentation device 22. The presentation device 22 presents a state in which the second presentation visual object vibrates with respect to the first presentation visual object according to the command $c_v$. For example, in the case where the presentation device 22 is a device that visually presents a video to the user 100, the presentation device 22 vibrates at least a part of a region of the second presentation visual object with respect to the first presentation visual object so as to include the "vibration component of the control frequency" having the magnitude based on the vibration control information v, and obtains and displays the video $o_v$, as described in the first embodiment or the modifications thereof. For example, in the case where the presentation device 22 is a device that visually presents a mechanical motion to the user 100, the presentation device 22 mechanically vibrates at least a part of a region of the second presentation visual object with respect to the first presentation visual object so as to include the "vibration component of the control frequency" having the magnitude based on the vibration control information v. The user 100 views the state presented in this manner and perceives an apparent force of the magnitude designated by designation information s (step S216).

Modification of Second Embodiment

A modification similar to the modifications 1 and 2 of the first embodiment may be made to the second embodiment. That is, in the second embodiment, the apparent force control device 21 may be able to select physical softness of the original first presentation visual object that is a subject, or may be able to select physical softness of the actual first presentation visual object, in addition to the magnitude of the vibration component of the control frequency included in the vibration. In addition, in the second embodiment, the apparent force control device 21 may independently control the apparent forces of each other, which are respectively applied to a plurality of simultaneously presented presentation visual objects. Alternatively, the presentation device 22 may present information for causing a performer to perform the state in which the second presentation visual object vibrates with respect to the first presentation visual object according to the command $c_v$, and the performer may perform a performance to vibrate a body part according to the information. In this case, the user 100 views this performance, thereby perceiving the apparent force of the magnitude designated by the designation information s.

Third Embodiment

A presentation device may present an apparent force of magnitude designated by designation information s by presenting a state in which a second presentation visual object vibrates with respect to a first presentation visual object, and an image capturing device may obtain a video that presents the apparent force of the magnitude designated by the designation information s by capturing the state.

Configuration

Figure 9:
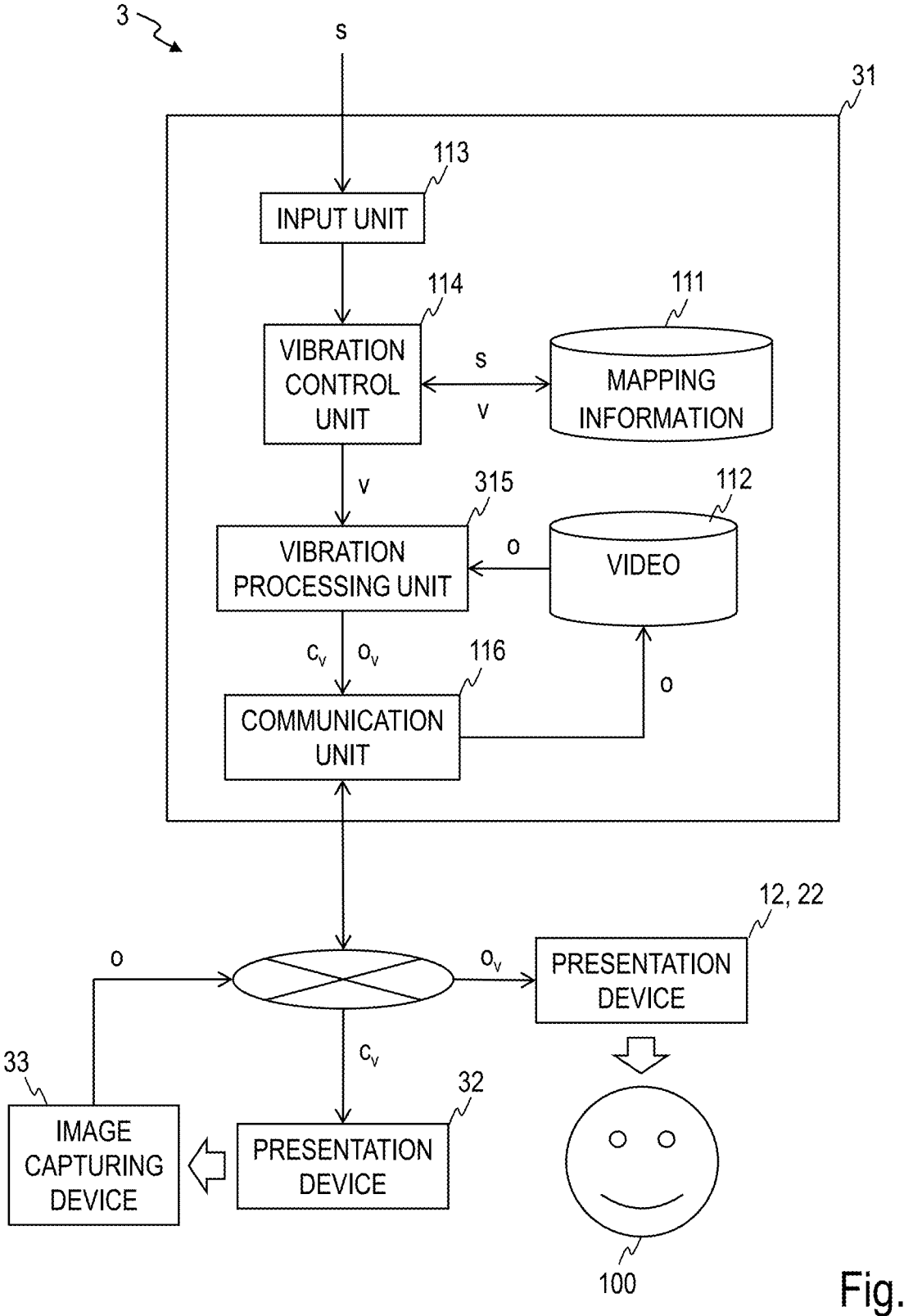
FIG. 9 is a block diagram illustrating, as an example, a configuration of an apparent force presentation system 3 according to a third embodiment.

As illustrated in FIG. 9, an apparent force presentation system 3 of the present embodiment includes an apparent force control device 31, a presentation device 12 or 22, a presentation device 32, and an image capturing device 33. The present embodiment illustrates an example in which the apparent force control device 31, the presentation devices 12 or 22, and 32, and the image capturing device 33 are configured to be communicable via a network. However, this example does not limit the present invention. The apparent force control device 31 includes storage units 111 and 112, an input unit 113, a vibration control unit 114, a vibration processing unit 315, and a communication unit 116. A hardware configuration of the apparent force control device 31 will be described below. The presentation device 32 is a device that visually presents a mechanical motion to a user 100. The presentation device 32 is, for example, a device such as a testing machine, a robot, a toy, or a product demonstrator capable of vibrating an object (second presentation visual object) with respect to another object (first presentation visual object) at a designated vibration frequency. The image capturing device 33 is, for example, a camera capable of capturing a moving image.

<Preprocessing>

As preprocessing, mapping information described in the first embodiment is stored in the storage unit 111.

<Vibration Control Processing>

The following vibration control processing is executed on the premise of the above-described preprocessing. First, the apparent force control device 31 executes processing of steps S113 and S114 described in the first embodiment. Vibration control information v obtained in step S114 is input to the vibration processing unit 315. The vibration processing unit 315 obtains and outputs a command $c_v$ for vibrating a second presentation visual object with respect to a first presentation visual object so as to include a "vibration component of a control frequency" having magnitude based on the vibration control information v (step S315). The command $c_v$ is transmitted to the outside via the communication unit 116, and is further transmitted to the presentation device 32. The presentation device 32 mechanically vibrates at least a part of a region of the second presentation visual object with respect to the first presentation visual object so as to include the "vibration component of the control frequency" having the magnitude based on the vibration control information v according to the command $c_v$. That is, the presentation device 32 presents a state in which the second presentation visual object vibrates with respect to the first presentation visual object according to the command $c_v$ output from the vibration processing unit 315. The image capturing device 33 captures the state presented by the presentation device 32, obtains a video o, and outputs the video o. The video o is sent to the apparent force control device 31 via the network. The communication unit 116 of the apparent force control device 31 receives the video o and stores the video o in the storage unit 112 (step S316).

The video o stored in the storage unit 112 is used as described in the first embodiment, the modifications of the first embodiment, the second embodiment, or the modification of the second embodiment, for example.

[Hardware Configuration]

Each of the apparent force control devices 11, 21, and 31 according to each embodiment is a device configured with a general-purpose or dedicated computer executing a predetermined program, the computer including a processor (a hardware processor) such as a central processing unit (CPU) and a memory such as a random access memory (RAM) and a read only memory (ROM), for example. That is, each of the apparent force control devices 11, 21, and 31 according to each embodiment includes, for example, processing circuitry configured to implement each unit included in each of the apparent force control devices. The computer may include one processor and one memory, or may include a plurality of processors and a plurality of memories. The program may be installed into the computer, or may be recorded in a ROM or the like in advance. Also, some or all of the processing units may be configured using an electronic circuit that independently implements the processing functions, rather than an electronic circuit (circuitry) that forms the functional components by reading the program like a CPU. Also, an electronic circuit forming one device may include a plurality of CPUs.

Figure 10:
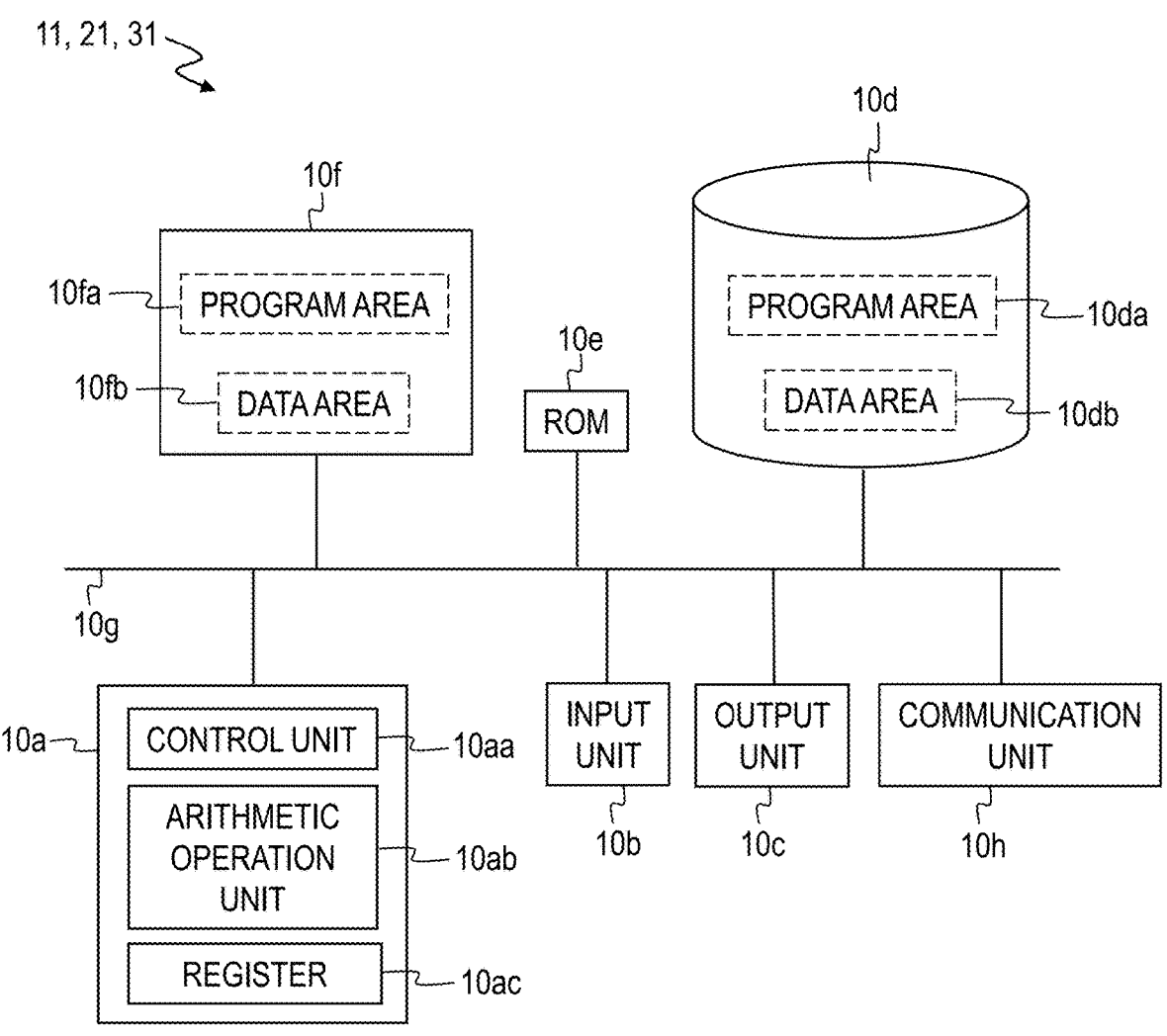
FIG. 10 is a diagram illustrating a hardware configuration of an apparent force control device according to an embodiment.

FIG. 10 is a block diagram illustrating a hardware configuration of each of the apparent force control devices 11, 21, and 31 according to each embodiment. As illustrated as the example in FIG. 10, each of the apparent force control devices 11, 21, and 31 of this example includes a central processing unit (CPU) 10*a*, an input unit 10*b*, an output unit 10*c*, a random access memory (RAM) 10*d*, a read only memory (ROM) 10*e*, an auxiliary storage device 10*f*, a communication unit 10*h*, and a bus 10*g*. The CPU 10*a* in this example includes a control unit 10*aa*, an arithmetic operation unit 10*ab*, and a register 10*ac*, and executes various arithmetic operations in accordance with various programs read into the register 10*ac*. The input unit 10*b* is an input terminal to which data is input, a keyboard, a mouse, a touch panel, or the like. Further, the output unit 10*c* is an output terminal, a display, or the like from which data is output. The communication unit 10*h* is a LAN card or the like controlled by the CPU 10*a* that has read a predetermined program. The RAM 10*d* is a static random-access memory (SRAM), a dynamic random-access memory (DRAM), or the like, and incudes a program area 10*da* in which a predetermined program is stored and a data area 10*db* in which various kinds of data are stored. The auxiliary storage device 10*f* is a hard disk, a magneto-optical disc (MO), a semiconductor memory, or the like, for example, and includes a program area 10*fa* in which a predetermined program is stored and a data area 10*fb* in which various kinds of data are stored. The bus 10*g* connects the CPU 10*a*, the input unit 10*b*, the output unit 10*c*, the RAM 10*d*, the ROM 10*e*, the communication unit 10*h*, and the auxiliary storage device 10*f* so as to be able to exchange information among them. The CPU 10*a* writes, into the program area 10*da* of the RAM 10*d*, the program stored in the program area 10*fa* of the auxiliary storage device 10*f* in accordance with a read operating system (OS) program. Likewise, the CPU 10*a* writes, into the data area 10*db* of the RAM 10*d*, the various kinds of data stored in the data area 10*fb* of the auxiliary storage device 10*f*. Addresses on the RAM 10*d* at which the program and the data have been written are stored into the register 10*ac* of the CPU 10*a*. The control unit 10*aa* of the CPU 10*a* sequentially reads these addresses stored in the register 10*ac*, reads the program and the data from the areas in the RAM 10*d* indicated by the read addresses, causes the arithmetic operation unit 10*ab* to sequentially execute arithmetic operations indicated by the program, and stores results of the arithmetic operations into the register 10*ac*. With such a configuration, the functional components of the apparent force control devices 11, 21, and 31 are obtained.

The program described above can be recorded in a computer-readable recording medium. Examples of the computer-readable recording medium include a non-transitory recording medium. Examples of such a recording medium include a magnetic recording device, an optical disc, a magneto-optical recording medium, a semiconductor memory, and the like.

The program is distributed by selling, giving, or renting portable recording media such as DVDs or CD-ROMs recording the program thereon, for example. Further, a configuration in which the program is stored in a storage device in a server computer and is distributed by transfer from the server computer to other computers via a network may also be employed. As described above, the computer executing such a program first stores a program recorded in a portable recording medium or a program transferred from the server computer temporarily into a storage device of the computer, for example. At the time of execution of a process, the computer reads the program stored in the storage device of the computer, and performs processing in accordance with the read program. Also, in other modes of execution of the program, the computer may read the program directly from a portable recording medium and performs processing in accordance with the program, or alternatively, the computer may sequentially perform processing in accordance with a received program every time a program is transferred from the server computer to the computer. Moreover, the above-described processing may be executed by a so-called application service provider (ASP) type service that implements a processing function only by an execution instruction and result acquisition without transferring the program from the server computer to the computer. Note that the program in the present embodiment includes information used for processing by an electronic computer and equivalent to the program (data or the like that is not a direct command to the computer but has property that defines processing performed by the computer).

Although this device is formed with a computer executing a predetermined program in each embodiment, at least some of the processing contents may be implemented by hardware.

Other Modifications

Note that the present invention is not limited to the embodiments described above. For example, in each of the above-described embodiments, an example has been described in which the apparent force control device and the presentation device or the image capturing device are configured to be communicable via the network. However, this does not limit the present invention, and these devices may be directly connected in a communicable manner, or the functions of the presentation device or the image capturing device may be integrated in the apparent force control device. Alternatively, the apparent force control device may be dispersedly arranged in a plurality of devices, and the plurality of devices may be configured to be communicable.

Also, various kinds of processing described above may be executed not only in time series in accordance with the description but also in parallel or individually in accordance with processing capabilities of the devices that execute the processes or as necessary. It is needless to say that appropriate modifications can be made without departing from the gist of the present invention.

REFERENCE SIGNS LIST

1, 2, 3 Apparent force presentation system
11, 21, 31 Apparent force control device
114 Vibration control unit
115, 215, 315 Vibration processing unit
12, 22, 32 Presentation device
33 Image capturing device

21

The invention claimed is:

1. An apparent force control device for creating illusion of a visual object applying a force upon another visual object, comprising processing circuitry configured to:

receive a magnitude of an apparent force that appears to be applied to a first presentation visual object by a second presentation visual object to be displayed on a screen;

transform the received magnitude of the apparent force into vibration control information for vibrating the second presentation visual object relative to the first presentation visual object, wherein the vibration control information comprises a vibration component of a predetermined control frequency corresponding to the received magnitude of the apparent force; and create displayed illusion of the second presentation visual object applying the magnitude of the apparent force upon the first presentation visual object by updating display of the second presentation visual object according to the vibration control information, wherein the second presentation visual object is within proximity of the first presentation visual object.

2. The apparent force control device according to claim 1, wherein the predetermined control frequency represents a frequency in a range between 4 times per second and 7 times per second.

3. The apparent force control device according to claim 1, wherein the vibration control information includes information for controlling magnitude of the vibration component of the predetermined control frequency included in vibration of the second presentation visual object relative to the first presentation visual object.

4. An apparent force control device comprising processing circuitry configured to:

receive designation information for designating magnitude of an apparent force that appears to be applied to a first visual object by a second visual object to be displayed on a screen;

using information indicating a correspondence between a vibration index representing magnitude of a vibration component of a predetermined control frequency and an apparent force index, the apparent force index representing the magnitude of the apparent force that appears to be applied from the second visual object to the first visual object by vibrating the second visual object with respect to the first visual object, the second visual object being within proximity of the first visual object, so as to include the vibration component of the predetermined control frequency having the magnitude represented by the vibration index, transform the received magnitude of the apparent force into vibration control information indicating the magnitude of the vibration component of the predetermined control frequency represented by the vibration index for vibrating the second visual object relative to the first visual object, the vibration control information comprises a vibration component of the predetermined control frequency corresponding to the received magnitude of the apparent force, and the vibration control information corresponding to the apparent force index representing the magnitude of the apparent force designated by the designation information; and create displayed illusion of the second visual object applying the magnitude of the apparent force upon the first visual object by updating display of the second visual object according to the vibration control information, wherein the second visual object is within proximity of the first visual object.

5. The apparent force control device according to claim 1, wherein the vibration control information is information for vibrating a fourth presentation visual object with respect to a third presentation visual object, the fourth presentation visual object being within proximity of the third presentation visual object to be presented together with the first presentation visual object, so as to include the vibration component of the predetermined control frequency, and making an apparent force appear to be applied from the fourth presentation visual object to the third presentation visual object, and is information for independently controlling the magnitude of the vibration component of the predetermined control frequency included in the vibration of the second presentation visual object with respect to the first presentation visual object, and the magnitude of the vibration component of the predetermined control frequency included in the vibration of the fourth presentation visual object with respect to the third presentation visual object.

6. The apparent force control device according to claim 1, wherein the processing circuitry is configured to further:

obtain and output a presentation visual object indicating a state in which the second presentation visual object vibrates with respect to the first presentation visual object so as to include the vibration component of the predetermined control frequency on the basis of the vibration control information.

7. An apparent force presentation system comprising:

the apparent force control device according to claim 6, the processing circuitry further configured to:

obtain and output a command for vibrating the second presentation visual object with respect to the first presentation visual object so as to include the vibration component of the predetermined control frequency on the basis of the vibration control information, wherein the apparent force control device outputs the command, and the apparent force presentation system further comprising:

a presentation device that presents a state in which the second presentation visual object vibrates with respect to the first presentation visual object according to the command; and an image capturing device that captures the state presented by the presentation device to obtain a video.

8. An apparent force control method for creating illusion of a visual object applying a force upon another visual object, the apparent force control method comprising:

receiving a magnitude of an apparent force that appears to be applied to a first presentation visual object by a second presentation visual object to be displayed on a screen;

transforming the received magnitude of the apparent force into vibration control information for vibrating the second presentation visual object relative to the first presentation visual object, wherein the vibration control information comprises a vibration component of a predetermined control frequency corresponding to the received magnitude of the apparent force; and creating displayed illusion of the second presentation visual object applying the magnitude of the apparent force upon the first presentation visual object by updating display of the second visual object according to the vibration control information, wherein the second presentation visual object is within proximity of the first presentation visual object.

9. A non-transitory computer-readable recording medium storing program for causing a computer to function as the apparent force control device according to claim 1.

10. An apparent force control device for creating illusion of a visual object applying a force upon another visual object, comprising processing circuitry configured to:
  receive a magnitude of an apparent force that appears to be applied to a first presentation visual object by a second presentation visual object presented by a physical object;
  transform the received magnitude of the apparent force into vibration control information for vibrating the second presentation visual object relative to the first presentation visual object, wherein the vibration control information comprises a vibration component of a predetermined control frequency corresponding to the received magnitude of the apparent force; and
  create visual illusion of the second presentation visual object applying the magnitude of the apparent force upon the first presentation visual object by mechanically vibrating at least a part of the second presentation visual object according to the vibration control information, wherein the second presentation visual object is within proximity of the first presentation visual object.

11. An apparent force control device comprising processing circuitry configured to:
  receive designation information for designating magnitude of an apparent force that appears to be applied to a first visual object by a second visual object to be displayed on a screen;
  using information indicating a correspondence between a vibration index representing magnitude of a vibration component of a predetermined control frequency and an apparent force index, the apparent force index representing the magnitude of the apparent force that appears to be applied from the second visual object to the first visual object by vibrating the second visual object with respect to the first visual object, the second visual object being within proximity of the first visual object, so as to include the vibration component of the predetermined control frequency having the magnitude represented by the vibration index, transform the received magnitude of the apparent force into vibration control information indicating the magnitude of the vibration component of the predetermined control frequency represented by the vibration index for vibrating the second visual object relative to the first visual object,
  the vibration control information comprises a vibration component of the predetermined control frequency corresponding to the received magnitude of the apparent force, and the vibration control information corresponding to the apparent force index representing the magnitude of the apparent force designated by the designation information; and
  create visual illusion of the second visual object applying the magnitude of the apparent force upon the first visual object by mechanically vibrating at least a part of the second visual object according to the vibration control information, wherein the second visual object is within proximity of the first visual object.

12. An apparent force control method for creating illusion of a visual object applying a force upon another visual object, the apparent force control method comprising:
  receiving a magnitude of an apparent force that appears to be applied to a first presentation visual object by a second presentation visual object to be displayed on a screen;
  transforming the received magnitude of the apparent force into vibration control information for vibrating the second presentation visual object relative to the first presentation visual object, wherein the vibration control information comprises a vibration component of a predetermined control frequency corresponding to the received magnitude of the apparent force; and
  creating visual illusion of the second presentation visual object applying the magnitude of the apparent force upon the first presentation visual object by mechanically vibrating at least a part of the second presentation visual object according to the vibration control information, wherein the second presentation visual object is within proximity of the first presentation visual object.

13. A non-transitory computer-readable recording medium storing program for causing a computer to function as the apparent force control device according to claim 10.

14. A non-transitory computer-readable recording medium storing program for causing a computer to function as the apparent force control device according to claim 11.

* * * * *